United States Patent [19]

Czepel et al.

[11] 4,277,532
[45] Jul. 7, 1981

[54] THERMALLY EXPANDABLE SEALANTS

[75] Inventors: Hubert Czepel, Linz; Franz Jilek, Gallneukirchen; Heinz Zochbauer, Linz, all of Austria

[73] Assignee: Chemie Linz Aktiengesellschaft, Linz, Austria

[21] Appl. No.: 70,373

[22] Filed: Aug. 27, 1979

[30] Foreign Application Priority Data

Sep. 26, 1978 [DE] Fed. Rep. of Germany ....... 2841907

[51] Int. Cl.$^3$ ......................... B65D 53/06; B32B 5/16
[52] U.S. Cl. ...................................... 428/244; 52/232; 277/227; 428/268; 428/273; 428/278; 428/290; 428/306; 428/436; 428/442; 428/443; 428/522; 428/524; 428/920; 428/921; 428/323; 428/329; 428/367; 428/408
[58] Field of Search ............... 428/367, 408, 443, 442, 428/323, 329, 244, 522, 306, 524, 436, 921, 920, 268, 273, 278, 290; 277/227; 52/232

[56] References Cited

U.S. PATENT DOCUMENTS

| 3,404,061 | 10/1968 | Shane | 428/408 |
|---|---|---|---|
| 3,627,551 | 12/1971 | Olstowski | 106/56 |
| 3,770,480 | 11/1973 | Farnam | 428/443 |
| 3,826,074 | 7/1974 | Uffner | 428/442 |
| 4,072,531 | 2/1978 | Funabiki | 106/56 |
| 4,108,211 | 12/1979 | Olcott | 428/408 |
| 4,173,681 | 11/1979 | Durrieu | 428/443 |

FOREIGN PATENT DOCUMENTS 1450421 9/1976 United Kingdom .
1497118 1/1978 United Kingdom .

*Primary Examiner*—Ellis P. Robinson
*Attorney, Agent, or Firm*—Ladas & Parry

[57] ABSTRACT

A thermally-expandable sealant for joints, cavities or holes, which foams in the event of a fire and thereby effects a seal, comprising as a carrier a fleece or fabric made of glass or plastic, which is coated with a composition based upon expandable graphite and containing, per 100 parts by weight of expandable graphite, 10 to 30 parts by weight of polychlorobutadiene, 1 to 40 parts by weight of an alkylphenol/formaldehyde resin and 1 to 3 parts by weight of stabilizers known per se, and optionally, up to 30 parts by weight of inorganic fibers and up to 80 parts by weight of aluminium hydroxide. A process for sealing joints, cavities or holes using the sealant is also disclosed.

5 Claims, No Drawings

THERMALLY EXPANDABLE SEALANTS

BACKGROUND OF THE INVENTION

The present invention relates to a novel, improved sealant for joints or cavities. More particularly, the invention is concerned with a thermally expandable sealant comprising a fleece or fabric as the carrier, onto which is applied a coating based on expandable graphite, which coating foams in the event of a fire, and with a process for sealing walls or doors in the event of a fire, using the sealant according to the invention.

Hitherto, for the sealing of joints of fire-protection doors, hydrated alkali metal silicates have been used, these having been applied, in a concentrated form, to sealing strips made of sheet metal (see German Pat. Nos. 1,659,608 and 2,529,550) or of glass fiber fleece or fabric (see German Auslegeschrift No. 1,176,546 and German Auslegeschrift No. 1,169,832) and dried at temperatures below 150° C. Under the action of heat, these alkali metal silicates eliminate steam, as a result of which a frothy but brittle coating is formed as the heat insulator. The disadvantage of such joint-sealing compositions based on silicate is their hygroscopicity and their ready absorption of $CO_2$, as a result of which moist air impairs their expandability. For this reason, the compositions must be sealed, in as airtight a manner as possible, by means of a lacquer finishing coat or by means of a foil wrapping. Furthermore, in the expanded state they are brittle and sensitive to mechanical stress. The expandability of these silicate compositions is about 1:7 (30 minutes at 200° C.).

British Patent No. 1,497,118 further discloses that fire-protection paint and coating systems may be prepared from expandable graphite which is embedded in a binder system of halogen-containing elastomers and phenol/aldehyde resins. On exposure to heat, such paint systems form loosely bound, foam-like compositions which admittedly have low inherent strength but do have very good heat insulating capacity. The loose structure and low inherent strength make it necessary to use an inorganic silicate-based water-insensitive finishing coat which is also intended to protect the highly porous coke layer, containing expanded graphite, against oxidative attack by the flame gases in the event of a fire.

Surprisingly, it has now been found that a thermally expandable sealant having excellent sealing properties may be prepared if expandable graphite is mixed with certain amounts of polychlorobutadiene, an alkylphenol/formaldehyde resin and optionally aluminum hydroxide, and where appropriate, mineral fibers or stabilizers, and the mixture is applied to a fleece or fabric as the carrier. Such sealants, in the event of a fire, not only offer the advantage of high expandability but also, in contrast to the hitherto customary silicate-based sealants, are also distinguished by good flow and creep, which enables them to flow over edges and corners or flow into angled continuations of the joint which is to be sealed, and thereby achieve a complete seal, without losing the internal cohesion of the composition. Furthermore, the joint sealant according to the invention possesses sufficient strength not to crumble as a result of the fire draught, which is surprising because the previously known compositions based on expanded graphite have had to be protected by a finishing lacquer, causing cohesion, in order to increase their strength, whilst according to the invention a finishing lacquer would be disadvantageous since the material then could not display any flow properties. A further advantage of the material according to the invention is that the expansion process commences rapidly.

SUMMARY OF THE INVENTION

Accordingly, the present invention provides a thermally expandable sealant for joints, cavities or holes which comprises as a carrier, a fleece or fabric, made of glass or plastics material, which is coated with a composition based upon expandable graphite and containing, per 100 parts by weight of expandable graphite, 10 to 30 parts by weight of polychlorobutadiene, 1 to 40 parts by weight of an alkylphenol/formaldehyde resin and 1 to 3 parts by weight of stabilizers known per se, and, optionally, up to 30 parts by weight of inorganic fibers and up to 80 parts by weight of aluminum hydroxide. The particularly preferred alkylphenol/-formaldehyde resin is a tert-butylphenol/formaldehyde resin.

The sealant according to the invention has the advantage over hydrated alkali metal silicates that, even on prolonged contact with an atmosphere of any desired moisture content, it retains its expandability without any protective coating or wrapping. Furthermore, the sealant according to the invention has, dependent on the content of inorganic components and of elastomers, a certain intrinsic elasticity, in total contrast to the very brittle prior art sheets and strips of hydrated alkali silicates.

DETAILED DESCRIPTION OF THE INVENTION

The sealant according to the invention may contain the expandable composition in varying amounts, depending upon the desired thickness of the sealant in the expanded state. If it is borne in mind that the thickness expansion factor of the expandable composition used according to the invention is 1:10 to 1:15 at 200° C. and 30 minutes, it is possible to estimate the amount to be applied in order to achieve complete sealing of the joint or cavity. Particularly in the case of the sealing of joints, especially joints of fireprotection doors, it is advisable to apply a somewhat greater amount than corresponds to the thickness of the expanded composition required for sealing, in order to be able fully to utilize the capacity of the composition to flow into cavities which are at an angle to the joint, and thus further to improve the sealing effect. Usually, a coating, on the carrier of 500 to 2,500 g./m.$^2$ will prove satisfactory.

The sealant according to the invention is best prepared by coating the carrier with a spreadable composition which is obtained by stirring the constituents with a solvent. To prepare this spreadable composition it has proved particularly advantageous first to prepare a solution of the polychlorobutadiene and of the phenolic resin in an organic solvent, in which the expandable graphite and the inorganic constituents of the composition are then suspended. The amount of solvent is selected so that a spreadable paste with very good homogeneous distribution of the resins serving as binders is produced. Examples of solvents used are aromatic hydrocarbons, such as benzene or toluene, gasoline and/or acetone.

The paste thus obtained, is spread as uniformly as possible on the carrier, which is, for example, a glass fiber fleece, for example having a weight per unit area of 30–100 g./m.$^2$, a polyester or polypropylene fleece (weight per unit area about 50 g./m.²) or a glass fiber fabric (weight per unit area 50–500 g./m.²). The paste is then applied as homogeneously as possible to the fleece, for which purpose either knife-coating, or working with manual or mechanical coating equipment, may be employed.

After the coating has been applied, the solvent is evaporated off under normal or elevated temperature. It is also possible to start from an aqueous suspension of the binder resins, namely polychlorobutadiene and phenolic resin, and to add the expandable graphite and the inorganic constituents thereto, with vigorous stirring. After the application, the water must be evaporated off, which is more difficult than evaporating off an organic solvent, but has the advantage that the resulting off-gas does not contain organic vapors, which have to be recovered, or at least eliminated, before the gas issues into the atmosphere.

The present invention also provides a process for sealing joints, cavities and/or holes in doors, walls or windows, in the event of a fire, by applying sealant according to the invention to the joint, cavity or hole to be sealed. According to this process, the sealant according to the invention is cut, when necessary, into strips or patches of appropriate size which are inserted into the joint or cavity to be protected, the strip either being left lying loose or being fixed, for example by gluing.

The sealant according to the invention is used preferentially for the sealing of joints, above all joints at the edges of fire-protection doors. Of course, other applications, in which cavities are to be protected by means of heat-insulating materials, against the spread of fire and smoke, also are possible; for example, applications to passages for cables, passages for pipes and ventilation channels. In the event of a fire, the said cavities are filled with the fire-insulating insulant formed by foaming up as a result of the action of heat. When using the material for sealing joints of doors it is particularly surprising that the sealant, without a special protective skin, withstands constant mechanical handling without acquiring cracks or cavities which in the event of a fire could interfere with the sealing effect.

The following Examples illustrate the preparation of the sealant according to the invention and its use as a sealant under the action of heat.

EXAMPLE 1

Preparation of Sheet-Like Joint Sealant

A filament-reinforced 100 cm. wide glass fiber fleece, weighing 50 g./m.², was coated continuously with 2 kg./m.² of a moist coating composition in a continuously operating coating installation comprising a vessel for the solvent-containing coating material, a conveying device for the carrier, a spreading doctor and a drying tunnel.

The solvent-moist, coated web was immediately conveyed through the drying tunnel to remove the solvent and was then taken off in cut lengths of 2 m. and stacked. The weight per unit area of the finished cut lengths of the joint sealant was 1,450 g./m.² (1,400 g./m.² of coating composition + 50 g./m.² of glass fiber fleece).

The solvent-containing coating material had a solvent content of about 50% by weight. The solvent used was a mixture of approximately equal parts by weight of toluene, gasoline and acetone.

The dry coating had the following composition:

|  | Parts by Weight |
| --- | --- |
| Expandable graphite | 100 |
| Polychloroprene | 24 |
| Phenolic resin (tertiary butyl-phenol/formaldehyde resin) | 20 |
| Aluminum hydroxide | 48 |
| Asbestos fibers | 10 |
| Stabilizers | 2 |

The thickness of the sheet material was 1.9±0.2 mm.

The expansion factor on expansion by heating (30 minutes in a drying oven at 200° C.) was 1:13.

This material was subjected to a fire test in a small fire-testing oven according to DIN 18,082. Firestopping doors (T 30), provided with the sealant between the door frame and the door leaf were tested.

In the course of the experiment it was found that the expansion of the sealant according to the invention started after as little as 5 minutes from the beginning of the experiment and that the joints were completely tightly sealed after the experiment had lasted 10 minutes.

After completion of the fire experiment (30 minutes) the door prototype was removed, after first having attempted to open it. It was found that the material had completely filled the joints and had, by virtue of its good flow, additionally penetrated into the continuations of the joints, thereby effecting a complete seal.

For comparison with the above, an identical door carrying a known sealant comprising a carrier and hydrated alkali metal silicate was used. In the small fire-testing oven, under identical conditions, this material started to expand only in the 17$^{th}$ minute. The joint was sealed only after 22 minutes. At the end of the experiment, the joints were sealed but because of a lack of tendency to flow no filling of joint continuations was to be found.

EXAMPLES 2 to 11

Further mixtures of the compositions shown in the following Table were also prepared in an analogous manner to that of Example 1, and these, again, were brought to a solvent content of about 50% by weight. They were then applied by knife-coating on to a glass fiber fleece having a weight per unit area of 50 g./m.², and were dried. The material was cut into strips 20 mm wide and had a coating thickness of 1.9±0.2 mm.

The strips, together with the material according to Example 1, were subjected to measurement of the expandability (expansion factor on unhindered expansion) and to a test of their creep and/or flow characteristics.

The expansion factor was determined by measuring the thickness after 30 minutes storage in a drying cabinet at 200° C., after which storage the factor was recorded as the thickness of the coating after storage divided by the thickness before storage. The creep and/or flow characteristics were determined as follows: strip of the joint sealant which was to be tested (strip width: 20 mm) was inserted into an angled (90°) joint of sheet steel (internal width 4 mm). The steel sheet containing the strip was then heated with a bare torch flame until the joint contents had expanded to the maximum extent. The width of the sealant which had exuded into the open arm of the joint was then measured, from the angle onwards.

The results are shown in the Table which follows:

TABLE

| Examples | 2 | 3 | 4 | 5 | 6 | 7 | 8 | 9 | 10 | 11 |
|---|---|---|---|---|---|---|---|---|---|---|
| Composition (parts by weight) | | | | | | | | | | |
| Expandable graphite | 100 | 100 | 100 | 100 | 100 | 100 | 100 | 100 | 100 | 100 |
| Polychlorobutadiene | 24 | 15 | 24 | 24 | 24 | 24 | 24 | 24 | 30 | 24 |
| t-butylphenol/formaldehyde resin | 20 | 2 | 10 | 20 | 10 | 30 | 20 | 20 | 12.5 | 40 |
| Stabilizer | 2 | 2 | 2 | 2 | 2 | 2 | 2 | 2 | 2 | 2 |
| Asbestos fibers | 10 | 5 | 20 | 0 | 0 | 20 | 0 | 0 | 0 | 0 |
| Aluminum hydroxide | 48 | 0 | 20 | 48 | 48 | 48 | 0 | 80 | 0 | 0 |
| Expansion factor (unhindered expansion, 30 minutes at 200° C.) | 1:13 | 1:16 | 1:12 | 1:13 | 1:17 | 1:9 | 1:13 | 1:15 | 1:15 | 1:9 |
| Flow characteristics, % of the original width | 60 | 100 | 50 | 50 | 80 | 40 | 80 | 90 | 75 | 35 |

We claim:

1. A thermally expandable sealant having good flow and creep for the sealing of joints, cavities or holes, which comprises as a carrier a fleece or fabric, made of glass or plastics material, which is coated with a composition based upon expandable graphite and containing, per 100 parts by weight of expandable graphite, 10 to 30 parts by weight of polychlorobutadiene, 1 to 40 parts by weight of an alkylphenol/formaldehyde resin and 1 to 3 parts by weight of stabilizers known per se.

2. A sealant according to claim 1, in which the amount of the composition coated on the carrier is 500 to 2,500 g.m.$^2$.

3. A process for sealing joints, cavities or holes in doors, windows or walls of building structures in the event of a fire, which comprises applying to the joint, cavity or hole to be sealed an appropriate amount of a sealant according to claim 1, and affixing the sealant to the joint, cavity or hole by inserting it therein or bonding it thereto with glue.

4. A sealant according to claim 1 in which the coating composition additionally includes up to 30 parts by weight of inorganic fibers.

5. A sealant according to claim 1 in which the coating composition additionally includes up to 80 parts by weight of aluminum hydroxide.

* * * * *